United States Patent
Murphree

[15] 3,671,657
[45] June 20, 1972

[54] ECHO SYNTHESIZING APPARATUS
[72] Inventor: Francis J. Murphree, Winter Park, Fla.
[73] Assignee: The United States of America as represented by the Secretary of the Navy
[22] Filed: Dec. 1, 1970
[21] Appl. No.: 94,134

[52] U.S. Cl. .................................................. 35/10.4
[51] Int. Cl. .......................................................... G09b 9/00
[58] Field of Search ....................................................... 35/10.4

[56] References Cited
UNITED STATES PATENTS
3,555,165   1/1971   Ettenhofer .............................. 35/10.4

Primary Examiner—Malcolm F. Hubler
Attorney—Richard S. Sciascia, John W. Pease and Harvey A. David

[57] ABSTRACT

Echo synthesizing apparatus utilizing a fixed delay line having spaced taps connected to attenuators by gate means which are operated in an aspect dependent manner by shift registers so as to generate across an output resistor a composite echo signal having aspect dependent highlight characteristics. Embodiments providing also random and/or systematic variations as well as self-showing effects are described.

7 Claims, 6 Drawing Figures

Francis J. Murphree
INVENTOR

By Harvey A. David
John W. Pease
Attorneys

Francis J. Murphree
INVENTOR

By Harvey A. David
John M. Cinan
Attorneys 3,671,657

ECHO SYNTHESIZING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the generation of simulated sonar echoes, and more particularly to improved simulator apparatus for providing signals which more realistically emulate echoes from actual targets such as submarines and surface vessels.

Such echo simulators are desirable for use in mobile targets to be tracked by operational submarines or anti-submarine forces in training exercises, for use in decoy devices for misleading enemy anti-submarine measures, and for use in stationary or "dry-land" type sonar training devices.

Simulated echoes which behave as a function of target length, pulse length and aspect angle much as do real echoes may be generated by several techniques. In copending patent application Ser. No. 858,671, filed Sept. 17, 1969, there is described a means employing a number of operational signal generators (CWpulse, FM slide, etc.) or the like, which are triggered on at the proper time by a target length and highlight generator.

Another method is to apply an operational signal to the input of a tapped delay line and sum across a common load resistor fractions of the output at the various taps. The effective electrical delay between any pair of taps corresponding to two reflecting points on the target is made the same as the propagation delay involved in sound traveling from one point to the other and return. The total effective electrical delay required would equal the time required for sound to propagate from one end of the target to the other and return or $2S/c$ seconds where $S$ is the target length and $c$ the velocity of sound. The projected length of the target, assuming it to be much longer than any other dimension, is approximately $S|\cos\theta|$ where $\theta$ is the aspect angle. The delay at any aspect angle must hence be $2S/c\,|\cos\theta|$.

In copending patent application SER. No. 40,179 filed May 25, 1970, there is described a delay line echo simulation system using a shift register as a sampled data delay line. The overall delay in that system is controlled by changing the shift rate. The delay line in effect, is electrically stretched or compressed as dictated by changes in aspect $\theta$.

Another way to accomplish echo simulation utilizing delay line techniques is to switch taps of a fixed delay line in or out of the circuit as the aspect angle $\theta$ is changed, the outputs of the taps in circuit being combined to produce a desired echo envelope. This system can not only be readily applied to a sampled data system, but is particularly applicable when analog delay devices such as LC networks, electromechanical devices or magnetic recorders are used.

In any event, while a great deal of realism has been attained by the techniques and apparatus described in the aforementioned applications, there has remained room for improvement particularly with regard to several phenomena which are characteristic of actual sonar echoes. These phenomena include random and/or systematic fluctuating changes in echo amplitude and "shape" from ping to ping, and "shadowing" effects at extreme bow and stern aspects. The former phenomenon is commonly observed as a fluctuation of target echo amplitudes above and below their average value and can probably be attributed to changes in effectiveness of the individual scatterers composing a target as a function of aspect, to changing interference effects between the returns from the separate scatterers, and variations in the transmitting media due to temperature, salinity, marine life, suspended matter, and the like.

With regard to the latter phenomenon, that is one form of shadowing, it is sometimes observed that the length of the echo from a target does not continue to increase as the aspect angle becomes very small. At extreme bow or stern aspects the apparent echo length can be less than at some greater angle, apparently because of target self-shadowing effects.

SUMMARY OF THE INVENTION

With the foregoing in mind, it is a principal object of this invention to provide improved circuitry for the simulation of sonar echoes such that the simulated echoes approximate natural echoes in their behavior with respect to target aspect, target length, and pulse length.

Another important object of this invention is the provision in echo simulation circuitry of means for making the simulated echo fluctuate systematically and/or randomly or psuedo-randomly.

As another object the invention aims to provide for echo simulation wherein the echo length and amplitude fluctuations vary with aspect angle in a realistic manner.

Yet another object is the provision of echo simulation techniques which are applicable to either analog or digital processes.

Other objects and advantages of the invention will become apparent from the following detailed description thereof when read in conjunction with the accompanying sheets of drawings.

DESCRIPTION OF THE PREFERRED EMBODIMENTS

Figure 1:
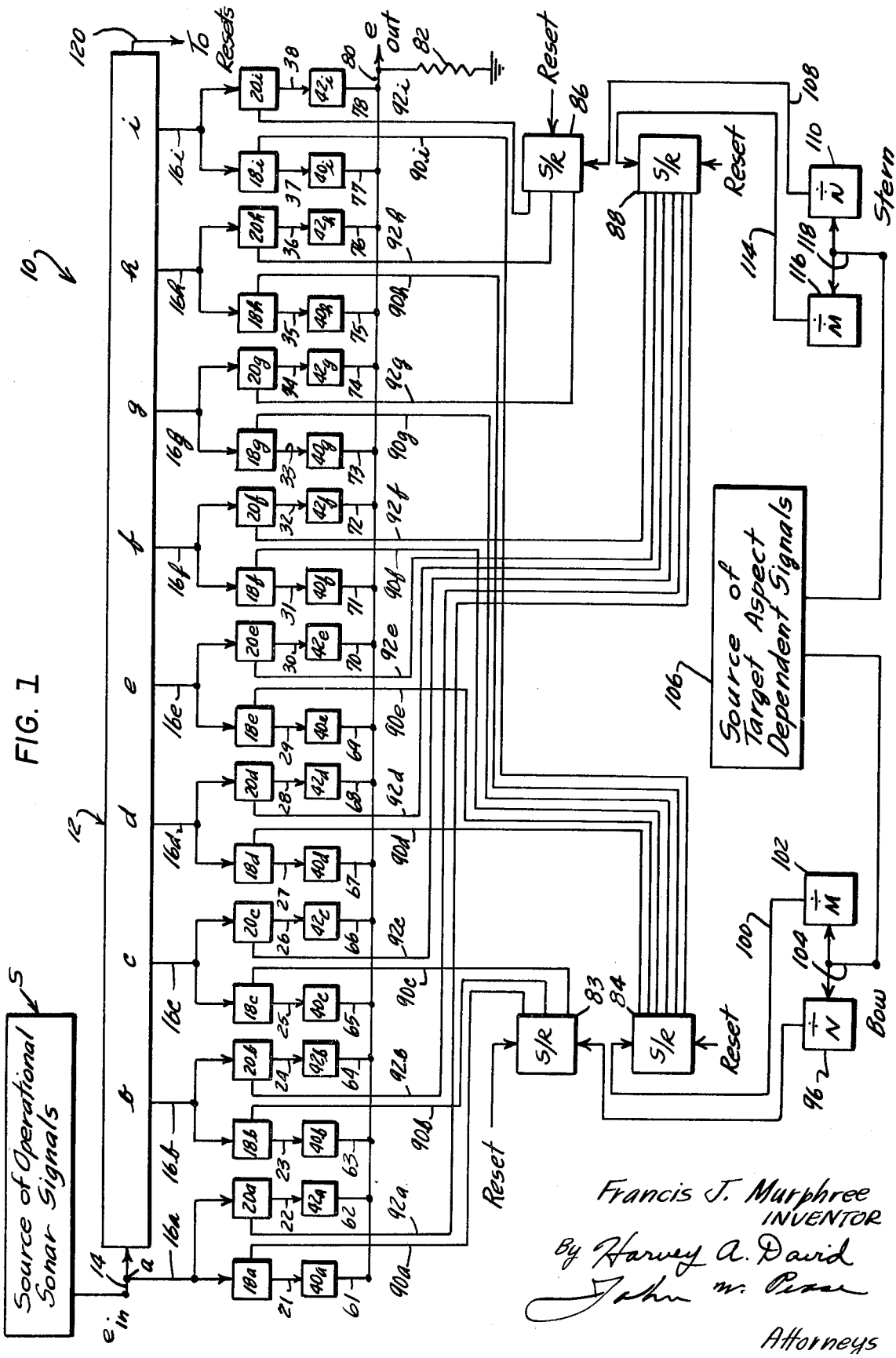
FIG. 1 is a diagrammatic illustration in block form of echo synthesizing apparatus embodying the present invention.

In the form of the invention illustrated in FIG. 1, there is provided an echo simulating apparatus 10 comprising a fixed delay line 12 having a plurality of spaced taps $b-i$ distributed therealong. An input signal $e_{in}$ is applied as shown via line 14 to the delay line 12. The signal $e_{in}$ may be derived from any suitable sources such as an operational sonar, recordings of an operational sonar, or programmed simulation means for simulating operational sonar signals. For simplicity, the term operational signal as used hereinafter may mean a signal $e_{in}$ from any such source. The incoming operational signal $e_{in}$ is further applied from a tap "$a$" via line 16$a$ to each of a set of electronic switch means in the form of a bow aspect gate 18$a$ and a stern aspect gate 20$a$. The delay line taps $b-i$ are similarly connected via lines 16$b$–16$i$ to bow aspect gates 18$b$–18 and to stern aspect gates 20$b$–20$i$, respectively.

The gates 18$a$–18$i$ and 20$a$–20$i$ are connected by lines 21–38 to corresponding signal attenuators 40$a$–40$i$ and 42$a$–42, and are adapted to be enabled in accordance with changes in simulated target aspect, either bow or stern in a manner and by means later described in more detail. The attenuators 40$a$–40$i$ and 42$a$–42$i$ comprise resistive means and are connected as shown by lines 61–78 to a common line 80 which is connected by an output resistor 82 to nominal ground. The output $e_{out}$ of the circuit 10 is taken from line 80.

Enabling of the bow aspect gates 18$a$–18$i$ is effected by a three stage shift register 83 and a six stage shift register 84, whereas enabling of the stern aspect gates 20$a$–20$i$ is effected by a three stage shift register 86 and a six stage shift register 88.

It will be understood that the number of shift register stages used is determined by the number of taps on the delay line, and that the number of such taps and stages described herein are by way of example only.

In the illustrated example, the first three bow aspect gates 18a, 18b and 18c are connected as shown by lines 90a, 90b and 90c to the three stages of the shift register 82, while the remaining bow aspect gates 18d–18i are connected as shown by lines 90d–90i to the six stages of the shift register 84. Similarly, the first three stern gates (working from the right hand end of delay line 12 as viewed in FIG. 1) 20i, 20h, and 20g are connected as shown by lines 92i, 92h, and 92g to the three stages of the shift register 86, while the remaining stern aspect gates 20f–20a are connected as shown by lines 92f–92a to the six stages of the shift register 88. The shift register 83 receives, as its input, pulses via line 94 from a divide by N frequency divider 96. The shift register 84 receives, as its input, pulses via line 100 from a divide by M frequency divider 102. The dividers 96 and 102 receive as their inputs via line 104 from a source 106 of target aspect dependent signals a train of pulses the number of which is a function of the simulated target bow aspect when a bow aspect condition prevails.

The shift register 86 receives, as its input, pulses via line 108 from a divide by N frequency divider 110. The shift register 88 receives, as its input, pulses via line 114 from a divide by M frequency divider 116. The dividers 110 and 116 receive as their inputs via line 118 from source 106 a train of pulses the number F of which is a function of the simulated target stern aspect when a stern aspect condition prevails.

The number F of pulses which are applied to either the line 104 or line 118, as the target aspect is characterized as bow or stern, may be derived from a recorded or computerized program if the circuit 10 is used in a land based training device such as a sonar trainer. Alternatively the train of pulses may be derived from an operational sonar signal by a suitable phase responsive circuit which receives and compares inputs from each of two spaced hydrophones and from that generates an aspect dependent output. Such phase responsive circuits are known in the art and are exemplified by U.S. Pat. No. 3,383,690 of E. A. Keller. The relation between the number F of pulses on lines 104 and 118 and the target aspect angle $\theta$ will be discussed more fully as this description proceeds.

In the operation of the device 10 an operational signal $e_{in}$ (FM slide, CW pulse, or other modulation scheme) having a time duration or pulse length 120 (FIGS. 2 and 3) is applied via line 14 to the delay line 12 and propagates down the line so that it appears in time sequence at taps $a, b, - - - i$. As noted above, these taps are connected to gates 18a–18i and 20a–20i. For a bow aspect echo of simulation, one or more of the gates 18a–18 will be open whereas for a stern aspect echo simulation one or more of the gates 20a–20i will be open. The number of gates open, whether bow or stern, will depend upon the target aspect angle $\theta$. If for discussion it is assumed that a head on or zero degree bow aspect exists, then all of the gates 18a–18 will be open and attenuators 40a–40i will be connected to line 80 and resistor 82. The ratio of the resistance of each of these attenuators to the resistance of resistor 82 determines the relative amplitude of the individual "highlights" of the simulated echo.

Figure 2:
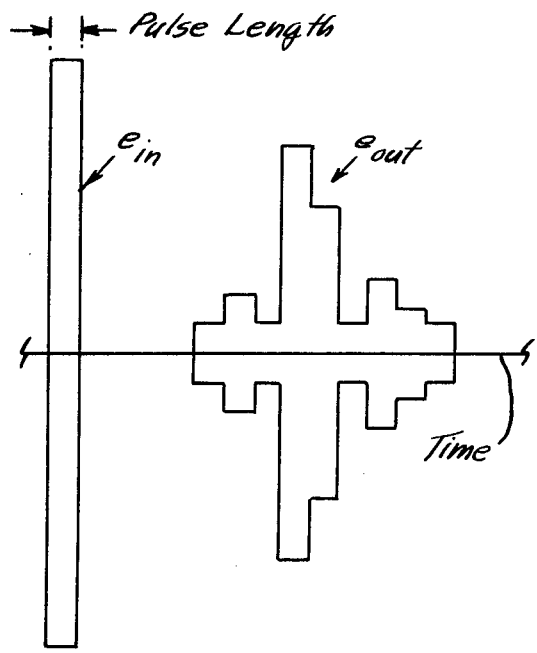
FIG. 2 is a graphic illustration of an input signal and a resulting idealized synthetic bow aspect signal produced by the apparatus of FIG. 1.

Thus, in FIG. 2 is shown the shape of an echo signal output $e_{out}$ developed on line 80 for a zero degree bow aspect. As bow aspect angles $\theta$ become greater than zero degrees, one or more of the gates 18a–18i are not turned on, starting from the extreme bow and stern ends so that the simulated echo signal $e_{out}$ becomes progressively shorter. The gates 18a–18i are controlled by the shift registers 83 and 84 in the following manner. Consider that when a logical one is present at any given stage of these shift registers, the gate connected thereto is on, and when a zero is present the gate is off. If three pulses are fed via line 94 into shift register 83 (assumed to be initially unloaded) logical ones will appear on the leads connected to gates 18a, 18b, and 18c. This turns those gates on and connects all three of the associated attenuators 40a, 40b, and 40c to line 80 and resistor 82. Similarly if six pulses are fed via line 100 to shift register 84, the remaining gates 18d–18i are turned on. The resulting composite output $e_{out}$ across resistor 82 will resemble an extreme bow aspect echo having nine potentially resolvable highlights. The three and six pulses applied to the shift registers 83 and 84, respectively, are derived by the divide by N and divide by M dividers 96 and 102 from the input to line 104 which represents the zero degree bow aspect angle. The number F of input pulses to line 104 is equal to $fk (|\cos\theta| + y)$, where $f$ is conveniently the frequency of the operational sonar signal, $y$ is a constant introduced to place a minimum bound on F as $\cos\theta$ approaches zero, and $k$ is a system constant. Assuming that the number F of pulses corresponding to a zero degree bow aspect is 1,000 applied to line 104, the divider 96 must divide by a number N which is approximately 333, while the divider 102 must divide by a number M which is approximately 166.

If the aspect angle $\theta$ has increased to some degree at the time of a subsequent signal $e_{in}$, the input of 104 will have decreased in accordance with the function $F = fk (|\cos\theta| + y)$. Accordingly, fewer of the stages of the shift registers 83 and 84 will be characterized by logical ones and the corresponding gates will remain closed or off. The resulting synthetic echo signal $e_{out}$ will be shortened at each end by those highlights for which the gates have not been turned on.

At the end of each echo simulation the shift registers 83, 84, 86 and 88 are, of course, reset to unloaded conditions. This is conveniently done by a signal derived from the end of delay line 12 beyond the last tap, as is indicated by line 120. The use of a plurality of shift registers 83 and 84 of different numbers of stages controlling the changes in the echo from opposite ends as aspect changes produces a more realistic simulation than if each were of the same number.

When a beam aspect is reached, $\cos\theta$ equals zero and the factor $y$ provides a value of F which ensures that at least a predetermined number of gates, preferably those connected to central, major highlight producing attenuators, are opened to produce a realistic echo signal.

Figure 3:
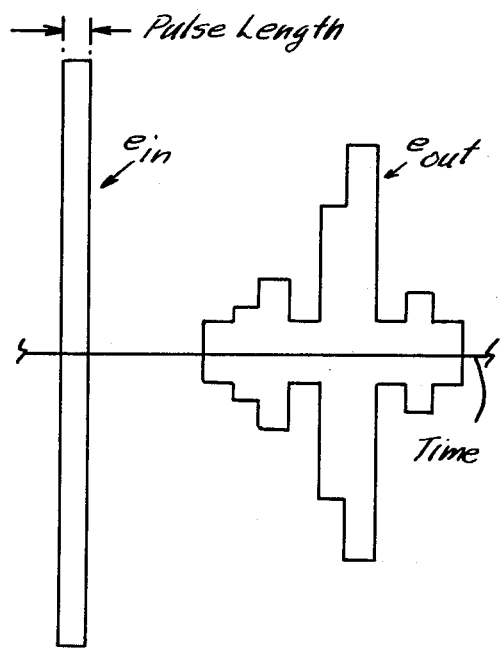
FIG 3 is similar to FIG. 2, but corresponds to a stern aspect.

When a stern aspect prevails, the pulses from source 106 are applied to line 118 and the dividers 110 and 116, shift registers 86 and 88, stern gates 20a–20i and corresponding attenuators operate in the same fashion as their counterparts described above with relation to bow aspect targets. FIG. 3 illustrates an idealized stern aspect composite echo signal $e_{out}$. Note that while the same number of highlights are shown for both bow and stern aspect echoes, this can be changed if desired. Further, the relative strengths of the same highlights as seen from the two different aspects can be changed by appropriate selection of attenuator values. Additionally, it should be kept in mind that the taps of the delay line 12 need not be equidistantly spaced as illustrated, but may be placed at varying distances along the line if necessary to produce highlight positioning which accurately simulates a given target. Also independently positioned bow and stern taps can be provided.

While in the present example nine delay line taps and highlights are used, in some operational embodiments more taps would be desirable to provide more highlights within the target length. In such a case the division by the dividers 96, 102, 110, and 116 would be less than indicated in the foregoing embodiment. The number of taps used in a given simulation would be related to the need to prevent conspicuous changes in echo length or symmetry with small aspect changes, and to the desire that at the shortest pulse length employed by the insonifying sonar some echo highlight overlap occurs. From 20 to 40 taps will probably be satisfactory in most cases.

Figure 4:
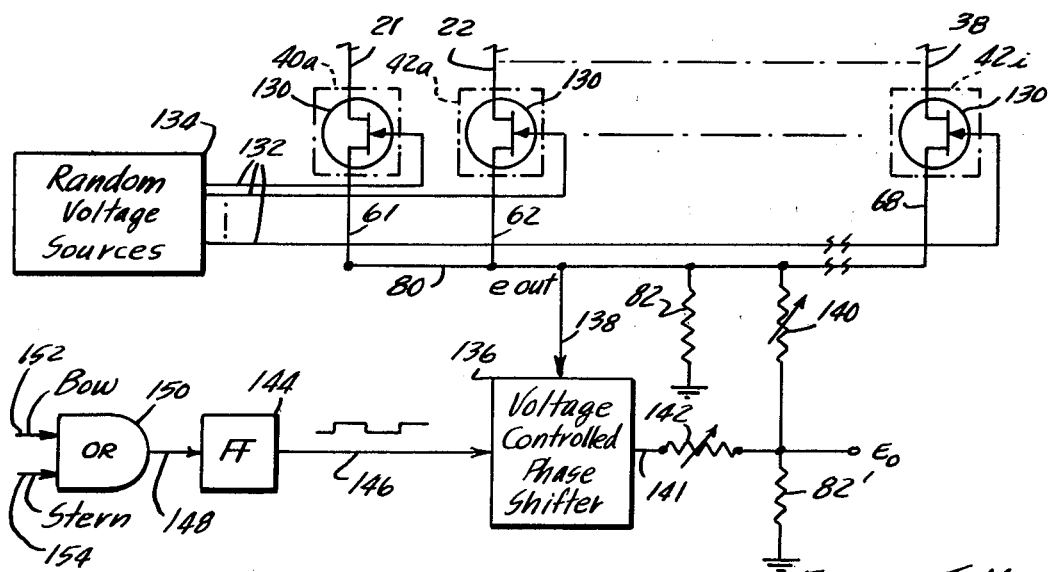
FIG. 4 is a fragmentary diagrammatic illustration in block form of another embodiment of the invention.

Referring now to FIG. 4, there is illustrated an embodiment of the invention which introduces systematic and/or random or psuedo-random fluctuations in echo amplitude. In this embodiment the attenuators 40a–40i and 42a–42i each comprises a voltage controlled resistance means in the form of a field effect transistor 130. Each of the field effect transistors 130 has its control element connected as shown by a line 132 to one of a plurality of random (or psuedo-random) voltage sources shown collectively at 134. The random voltages applied to the field effect transistors cause the resistances thereof to vary randomly from predetermined values whereby the output $e_{out}$ on line 82 constitutes highlights which vary randomly, but within predetermined limits, from the assigned highlight amplitude for each feature of the composite echo output signal $e_{out}$.

In order to also introduce a systematic variation which is sometimes observed with changing aspect, the embodiment of FIG. 4 further comprises a voltage controlled phase shifter 136 to which the composite signal $e_{out}$ is applied as shown by line 138. The composite signal is also applied to an output resistor 82' through a variable resistor 140. The output of the phase shifter 136 on line 141 is also applied to the resistor 82' through a variable resistor 142.

The amount of phase shift introduced by the phase shifter 136 depends upon the state of a flip-flop 144 which is connected to the phase shifter as shown by line 146. The flip-flop 144 is in turn connected to receive a train of input pulses via line 148 from an OR gate 150 which receives as alternative inputs, represented by lines 152 and 154, the same inputs as are applied to lines 104 and 118 respectively.

As the target aspect changes from 0° to 90° the flip-flop will be in a particular state (either 0 or 1)

$$\frac{fk(|\cos\theta|+y)}{2}$$

times so that the phase shift has a corresponding value the same number of times. This value could be, for example, 0° and 180° so that $E_{out}$ is a maximum for one value and a minimum for the other. By making $fk$ large the value of $fk(|\cos\theta|+y)$ can be made to change one unit for a small change in $\theta$, thus causing periodic changes in the echo level with small changes in $\theta$ similar to that noticed in nature. The number of maxima and minima can be controlled by choice of $kf$ and/or by using two or more flip-flops 144 in series. In the last case the phase shifter control voltage could be obtained by summing the outputs of all "0" or "1" outputs, thus generating more than two voltage levels and related phase shifts. It should also be noted that it would be advantageous if $f$ equals the frequency of the operational input signal, since in this case the number of target lobes will be dependent on the signal frequency. The net result of the embodiment of FIG. 4 is that there is an aspect dependent as well as a random, non-aspect related modulation of the simulated echo $E_{out}$. For mobile applications the random modulation may not be necessary.

Figure 5:
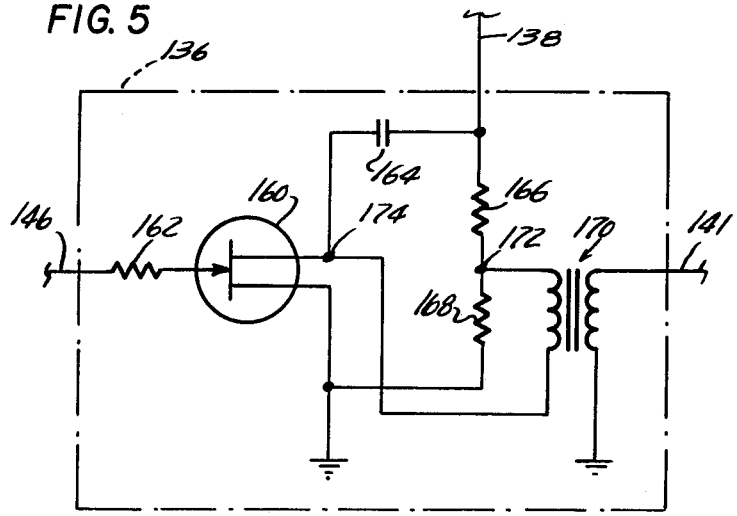
FIG. 5 is a diagram of a phase shifter circuit forming part of the embodiment of FIG. 4.

Referring to FIG. 5, the voltage controlled phase shifter 136 typically comprises a field effect transistor 160 the control element of which is coupled via resistor 162 to the line 146 from flip-flop 144. The transistor 160 forms a variable resistance leg of a network including a capacitor 164 and resistors 166, 168 connected between the signal $e_{out}$ on line 138 and nominal ground. The primary of an output transformer 170 is connected across junctions 172 and 174, thereby coupling the phase shifter output to line 141 for application through resistor 142 to the resistor 82'. Of course other well known forms of voltage controlled phase shifter may be used as the element 136 of FIG. 4.

Figure 6:
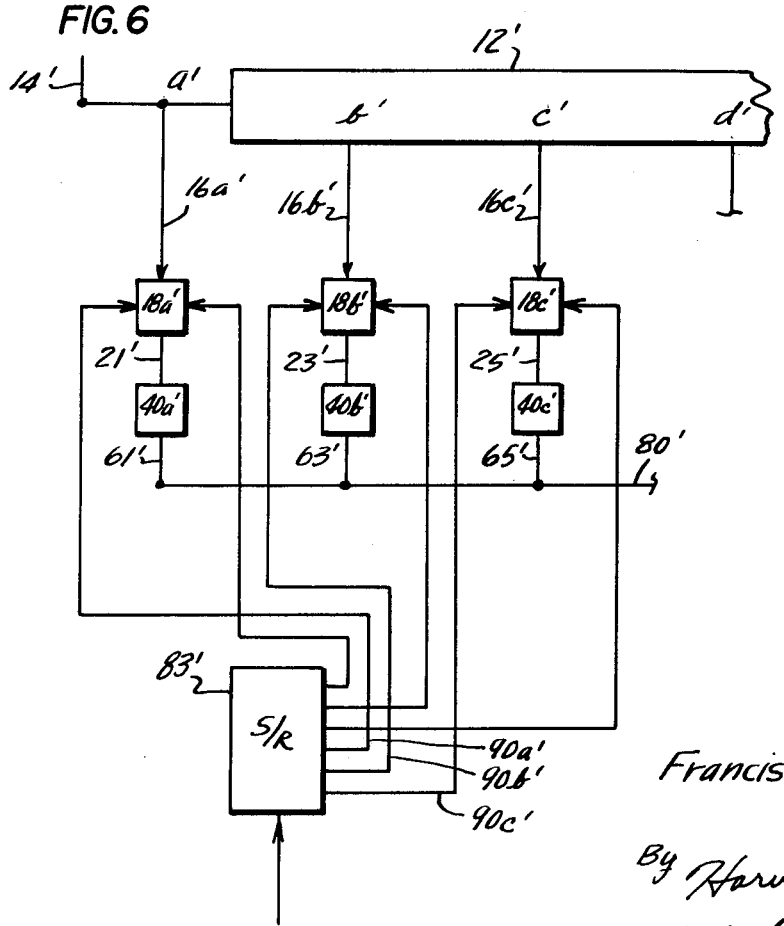
FIG. 6 is a fragmentary diagrammatic illustration, in block form, of still another embodiment of the invention.

As noted in the background discussion, it is sometimes observed that the length of the echo from a target does not continue to increase as the aspect angle becomes very small. That is to say at extreme bow or stern aspects the apparent echo length can be less than at some greater angle, apparently because of target self-shadowing effects. FIG. 6 illustrates a variation of the aforedescribed apparatus which achieves this characteristic.

Thus, in FIG. 6 wherein elements corresponding to those of FIG. 1 are given corresponding reference numerals with a prime mark added, the shift register 83' is provided with additional stages connected by lines 180a, 180b, and 180c to the gates 18a', 18b', and 18c', respectively. Assume a simulated target to be in the process of going from a relatively large bow aspect angle toward a lesser or zero degree aspect angle. At some angle greater than zero, the number of shift pulses applied via line 94' will enable all of the gates 18a', 18b', and 18c' for each sonar ping. As the angle $\theta$ lessens $\cos\theta$ increases, as does also the number of shift pulses applied to the register 83' for each ping, thereby causing inhibit signals to be transmitted to the gates 18c', 18b', and 18a' progressively in that order. The result is that the length of $e_{out}$ increases as the target goes from a beam aspect toward a bow aspect until a maximum echo length is reached sometime before an extreme bow on aspect occurs. As the target continues toward the zero degree or extreme bow aspect the echo shortens somewhat. Conversely, when the target turns from an extreme bow on or zero degree aspect the simulated echo will increase somewhat and then will decrease until the minimum length echo characteristic of a beam aspect is reached.

Obviously many modifications and variations of the present invention are possible in the light of the above teachings. It is therefore to be understood that within the scope of the appended claims the invention may be practiced otherwise than as specifically described.

What is claimed is:

1. In a sonar echo simulation system including a source of operational sonar signals and a source of target aspect dependent signals, echo synthesizing apparatus comprising:
   delay line means connected to receive said operational signals, said delay line means having a plurality of taps therealong located at predetermined intervals;
   an output resistor;
   a plurality of bow aspect highlight determining attenuators each having its output connected to said resistor;
   a plurality of stern aspect highlight determining attenuators each having its output connected to said resistor;
   a plurality of bow aspect gates each operative when enabled to pass signals from one of said taps to the input of one of said bow aspect highlight determining attenuators;
   a plurality of stern aspect gates each operative when enabled to pass signals from one of said taps to the input of one of said stern aspect highlight determining attenuators;
   bow aspect gate enabling first and second shift registers, said first shift register having a predetermined number of stages each connected to one of said bow gates, and said second shift register having a different number of stages each connected to a remaining one of said bow gates;
   first and second divider means connected to receive said aspect dependent signals and operative to drive said first and second shift registers respectively so that substantially all of said bow aspect gates are enabled when said aspect dependent signals correspond to an extreme bow on aspect, whereas progressively fewer of said bow aspect gates are enabled, working inwardly from opposite ends of the delay line as said aspect dependent signals, change to correspond to changes in said aspect toward a beam aspect;
   stern aspect gate enabling third and fourth shift registers, said third shift register having a predetermined number of stages each connected to one of said stern gates, and said fourth register having a different number of stages each connected to a remaining one of said stern gates; and
   third and fourth divider means connected to receive said aspect dependent signals and operative to drive said third and fourth shift registers respectively so that substantially all of said stern aspect gates are enabled when said aspect dependent signals correspond to an extreme stern on aspect whereas progressively fewer of said stern aspect gates are enabled, working inwardly from opposite ends of said delay line, as said aspect dependent signals change to correspond to changes in aspect toward a beam aspect;
   whereby a composite aspect dependent simulated echo signal having highlights is generated across said output resistor.

2. Echo synthesizing apparatus as defined in claim 1, and wherein:

said attenuators each comprise a voltage controlled variable resistance means;

said apparatus further comprising a source of randomly varying voltages; and said voltage controlled variable resistance means being responsive to said randomly varying voltages to alter the amplitudes of said highlights of said composite echo signal.

3. Echo synthesizing apparatus as defined in claim 1, and further comprising:

voltage controlled phase shifter means connected to receive said composite echo signal;

a second output resistor connected to receive said composite echo signal; and logic means connected to receive said target aspect dependent signals and operative in response thereto to provide an aspect dependent, systematically varying voltage output to said second output resistor;

whereby a systematically varying composite echo signal is developed across said second output resistor.

4. Echo synthesizing apparatus as defined in claim 1, and wherein:

said first shift register comprises additional stages connected to provide inhibit inputs to predetermined ones of said bow aspect gates, whereby at extreme bow on aspects said target echo is somewhat shorter than at less extreme aspect angles.

5. Echo synthesizing apparatus as defined in claim 2, and further comprising:

voltage controlled phase shifter means connected to receive said composite echo signal;

a second output resistor connected to receive said composite echo signal; and logic means connected to receive said target aspect dependent signals and operative in response thereto to provide an aspect dependent, systematically varying voltage output to said second output resistor;

whereby a systematically varying composite echo signal is developed across said second output resistor.

6. Echo synthesizing apparatus as defined in claim 2, and wherein:

said first shift register comprises additional stages connected to provide inhibit inputs to predetermined ones of said bow aspect gates, whereby at extreme bow on aspects said target echo is somewhat shorter than at less extreme aspect angles.

7. Echo synthesizing apparatus as defined in claim 3, and wherein:

said first shift register comprises additional stages connected to provide inhibit inputs to predetermined ones of said bow aspect gates, whereby at extreme bow on aspects said target echo is somewhat shorter than at less extreme aspect angles.

* * * * *